G. L. PALMER.
FISH SLIMER.
APPLICATION FILED MAY 28, 1914.
1,107,100.
Patented Aug. 11, 1914.
2 SHEETS—SHEET 2.
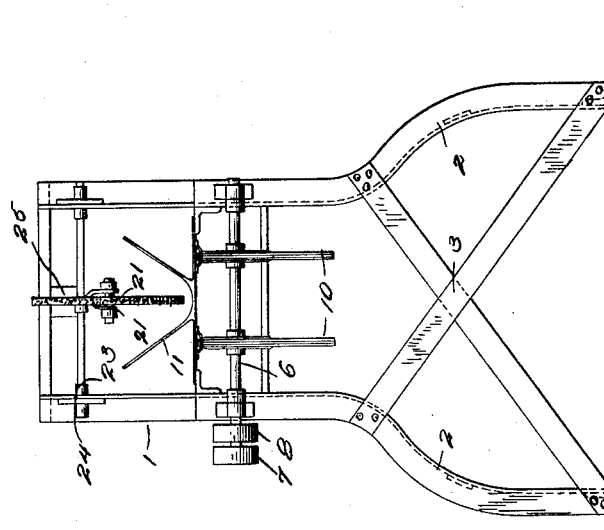
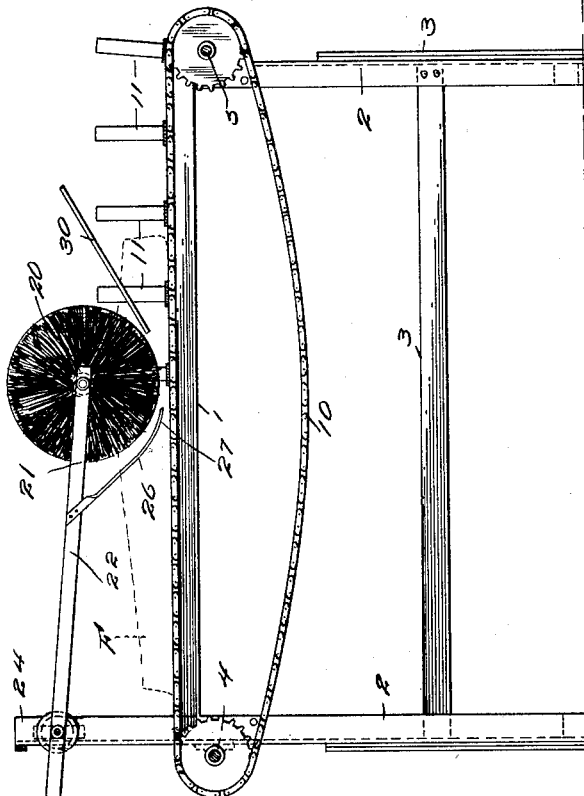
Inventor
Gustavus L. Palmer,
Witnesses
By Mason Fenwick Lawrence
Attorneys

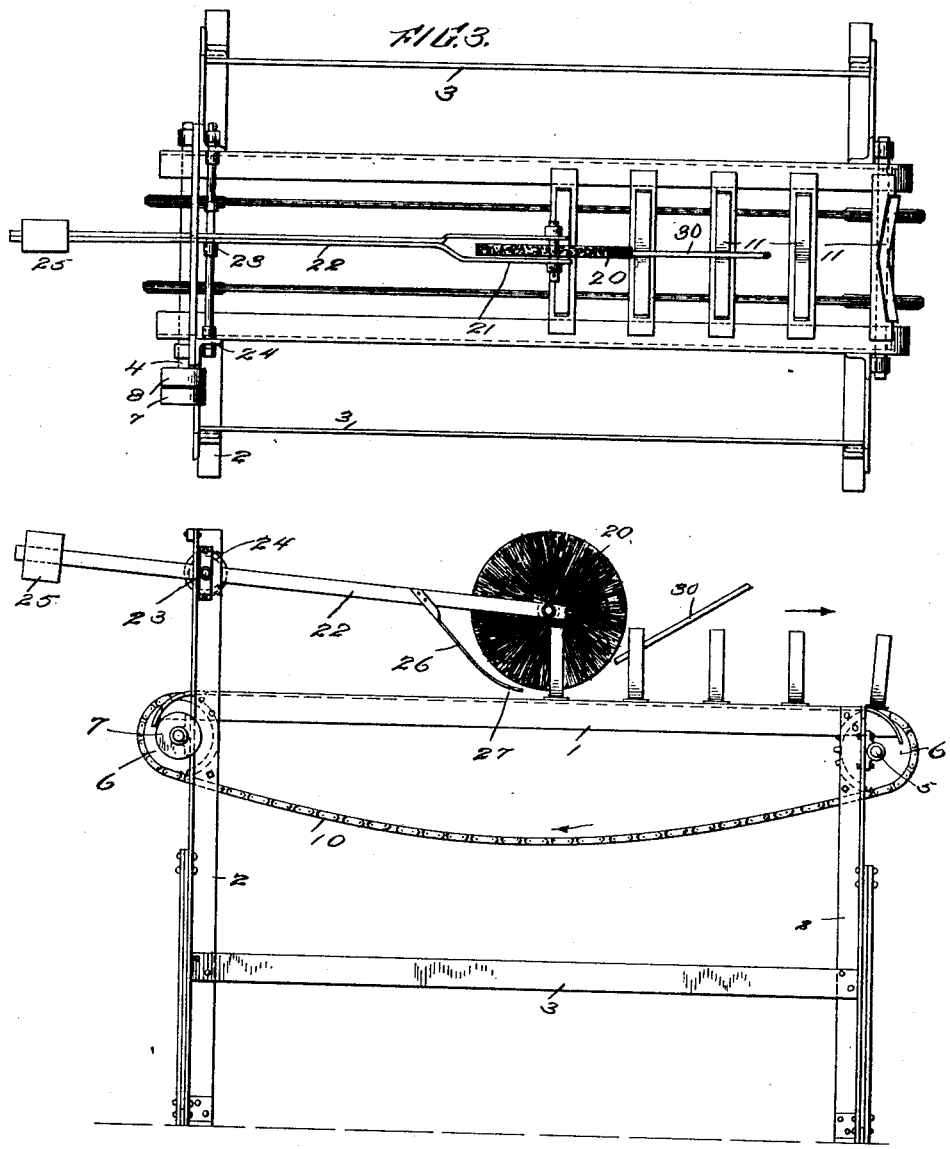

UNITED STATES PATENT OFFICE.

GUSTAVUS LAFAYETTE PALMER, OF TACOMA, WASHINGTON.

FISH-SLIMER.

1,107,100.  Specification of Letters Patent.  Patented Aug. 11, 1914.

Application filed May 28, 1914. Serial No. 841,647.

*To all whom it may concern:*

Be it known that I, GUSTAVUS LAFAYETTE PALMER, a citizen of the United States, residing at Tacoma, in the county of Pierce and State of Washington, have invented certain new and useful Improvements in Fish-Slimers; and I do hereby declare the following to be a full, clear, and exact description of the invention, such as will enable others skilled in the art to which it appertains to make and use the same.

This invention relates to fish dressing machines, and more especially to those intended to remove the entrails and blood from the carcass after it has been treated to remove the head and tail and the scales if there be any; and the object of the same is to so remove the entrails and blood, or to "slime" the fish, by the combined action of a wire brush and a jet or jets of water or other suitable fluid. The brush is of the rotary type, being a wheel mounted on a horizontal axis, and the water or other fluid is brought in any suitable manner to the machine and is directed obliquely downwardly and forward against or partly into the bristles of the brush, which is rotated by it, and by said fluid alone, and is caused to rotate in a direction the reverse of that in which the fish are fed. Experiment has proven that this system of sliming fish is economical and thorough, and a machine embodying the principle is extremely simple, and therefore inexpensive to manufacture and keep in order.

The preferred embodiment of my invention is described in the following specification and illustrated in the accompanying drawings, wherein:

Figure 1 is a side elevation of this machine; Fig. 2 is an end elevation; Fig. 3 is a plan view; and Fig. 4 is a longitudinal section.

In the drawings a table 1 is illustrated supported by legs 2 suitably braced as at 3, and across the front and rear ends of the table are journaled shafts 4 and 5 each carrying two sprocket wheels 6. One of these shafts may well be extended to carry tight and loose pulleys 7 and 8 to which is applied a belt leading from a suitable source of power; while the other shaft will run free in its bearings, although these details are not essential. The wheels are connected in pairs by endless chains 10 to which at suitable intervals and opposite points are connected Y-shaped members 11 which grasp the sides of the fish indicated at F. It is to be assumed that this fish has been butchered and his head, tail, fins, and perhaps the entrails removed, so that the inside of the carcass needs to be washed and the coagulated blood along the back bone removed. In fact, perhaps all the entrails will not have been taken out by the butchering process, and they also must be removed while sliming the fish. Whether the butchering has been done by hand or otherwise, and carefully or not, it is necessary that the sliming process shall wash the inside of the carcass clean.

The table top 1 is provided with a longitudinal groove into which the back of the fish is laid by the operator at the feed end of the table and the carcass is grasped by the Y-shaped members 11 and carried along to the rear, as usual in sliming machines, and it passes under a rotary brush 20 whose bristles are preferably of stout spring wire. In the preferred embodiment of my invention this brush is mounted in a fork 21 in the end of a lever 22, which lever is pivoted at 23 to a standard 24 rising from the table top 1, and is continued beyond the pivot and carries a weight 25. The latter is adjustable on the outer arm of the lever, and when set inward or outward by the operator more or less of the weight of the brush is counter-balanced and the pressure on the carcass may be varied at will. Depending from lever 22 is a finger 26 which I call a "rider," its lower end being bent slightly as at 27 and projected under the edge of the brush 20, and the function of this finger is to ride over the interior of the fish just before it passes under the brush and steady it within the carrier consisting of the two chains which are feeding it forward. This detail is not absolutely necessary, but I prefer its use. Also, the manner of mounting and adjusting the brush may be varied considerably.

The numeral 30 designates broadly a jet nozzle, although I do not wish to be limited to the shape, size, or number thereof. In the embodiment of my invention herewith illustrated this nozzle is directed obliquely downward under the rear side of the brush 20 and forward toward the fish as the latter is passing under the brush, and the shape of the outlet end of the nozzle is such that a stream or jet of some suitable fluid (herein referred to as water, although it might be steam, air, or any suitable fluid) will be thrown against the bristles of the brush on the descending side thereof and on a line almost strictly tangential to the brush itself, although I do not wish to be limited in this respect. The idea is that the stream or jet shall strike the bristles with some considerable force, whereby these results ensue: First, the impact rotates the brush and the latter need not necessarily have any other means for rotating it, although such means could be employed if desired. Second, the stream or jet is broken up to a greater or lesser degree depending upon the angle of impact and the character of the bristles. Third, the brush is to quite an extent cleansed of the entrails and blood which were taken up by its bristles and carried completely around it. Fourth, the material being brushed and washed out of the carcass is driven forcibly away from the fish being cleaned and it will doubtless be caught by suitable guards and conveyed into the waste as usual. In many fish which are thus slimed there is a membrane inside the carcass and beneath the back bone which covers the coagulated blood, and the stiff bristles should tear this membrane so that the jet may wash out the blood and wash away the membrane itself.

After the carcass has passed under the brush and been treated by it and by the jet, its subsequent treatment may be varied to quite an extent. It may be desirable in some cases and with some fish to pass them through a subsequent bath or treatment, but the same is not shown as it forms no part of this invention. I repeat that the fluid employed herein may be any which will successfully perform the work. It might be possible to employ a jet of air, although in that case the washing of the carcass would have to be done by the subsequent treatment just suggested. My present intention is to employ a jet of water, possibly hot, and the size of the jet and the force with which it is driven against the wheel will depend upon conditions. The materials and proportions of parts throughout the machine are not essential to the invention.

What is claimed as new is:

1. In a fish slimer, the combination with a rotary brush having stiff bristles, and means for moving the carcass under said brush; of a jet directed against the brush and carcass, and serving to rotate the former and cleanse the latter.

2. In a fish slimer, the combination with a rotary brush having stiff bristles, and means for forcibly moving the carcass under said brush; of a pipe directing a liquid jet obliquely downward and forward against the bristles of said brush and the carcass beneath it and serving to rotate the former and cleanse the latter.

3. In a fish slimer, the combination with a rotary brush standing on edge and having wire bristles, a table, and fish carrying mechanism consisting of parallel chains moving over said table alongside the brush and having oppositely disposed Y-shaped members for gripping the carcass; of a pipe standing in rear of the brush and directed obliquely downward and forward so as to deliver a jet of liquid tangentially against the rear side of the brush for rotating it and obliquely on the carcass for cleansing it.

4. In a fish slimer, the combination with a table having a standard at its forward end, fish carrying means moving rearward over said table, a lever pivoted in said standard and having its rear end forked, a rotary brush journaled in the fork, a finger depending from the lever and having its lower end bent in under the brush, and a counterweight on the forward end of the lever; of means for supplying a jet of liquid tangentially to the rear side of the brush, for the purpose set forth.

5. In a fish slimer, the combination with a table having a standard at its forward end, fish carrying means moving rearward over said table, a lever pivoted in said standard and having its rear end forked, a rotary brush journaled in the fork, and a finger depending from the lever and having its lower end bent in under the brush; of a pipe standing in rear of the brush and directed obliquely downward and forward so as to deliver a jet of liquid tangentially against the rear side of the brush for rotating it and obliquely on the carcass for cleansing it.

In testimony whereof I affix my signature in presence of two witnesses.

GUSTAVUS LAFAYETTE PALMER.

Witnesses:
ROBERT M. DAVIS,
C. L. STENNS.

---

Copies of this patent may be obtained for five cents each, by addressing the "Commissioner of Patents, Washington, D. C."